United States Patent
Stevenson et al.

(10) Patent No.: US 6,805,393 B1
(45) Date of Patent: Oct. 19, 2004

(54) DOUBLE PIVOTING REAR CLOSURE

(75) Inventors: Robin Stevenson, Bloomfield, MI (US); Jeffrey Lane Konchan, Washington, MI (US); Richard J Lange, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/644,228

(22) Filed: Aug. 20, 2003

(51) Int. Cl.$^7$ ............................................. B62D 35/00
(52) U.S. Cl. ..................... 296/50; 296/146.8; 296/51; 296/146.11
(58) Field of Search ........................ 296/50, 51, 146.8, 296/146.11

(56) References Cited

U.S. PATENT DOCUMENTS

| | | | | |
|---|---|---|---|---|
| 1,828,797 A | * | 10/1931 | Becker .......................... | 296/51 |
| 2,806,735 A | * | 9/1957 | Smith .......................... | 296/51 |
| 3,567,274 A | * | 3/1971 | Kaptur, Jr. et al. ........... | 296/50 |
| 5,320,397 A | | 6/1994 | Peterson et al. ............. | 296/57.1 |
| 5,352,008 A | * | 10/1994 | Denvir ......................... | 296/50 |
| 5,468,037 A | | 11/1995 | Peterson et al. ............. | 296/57.1 |
| 6,126,222 A | | 10/2000 | Nguyen et al. ............... | 296/56 |
| 6,131,989 A | * | 10/2000 | Montone et al. ........... | 296/146.8 |
| 6,179,361 B1 | | 1/2001 | Sailors ......................... | 296/50 |
| 6,390,527 B1 | * | 5/2002 | Leftridge ..................... | 296/56 |
| 2003/0122396 A1 | * | 7/2003 | Humphrey et al. ........... | 296/51 |

OTHER PUBLICATIONS

Article dated Feb. 2, 2002 from Firehouse.Com's University of Extrication—Rear Design Features of Vehicles: Part I.

* cited by examiner

*Primary Examiner*—Stephen Godon
(74) *Attorney, Agent, or Firm*—Laura C. Hargitt

(57) ABSTRACT

A rear closure assembly for use with a vehicle includes a door having first and second handles for pivoting the door about first and second vertical pivot axes. Latches on the door are engageable with strikers on the vehicle. The latches and strikers form the first and second vertical pivot axes. The latches are disengageable by the handles to selectively pivot the door about one of the vertical pivot axes.

14 Claims, 6 Drawing Sheets

DOUBLE PIVOTING REAR CLOSURE

TECHNICAL FIELD

The present invention relates to a double pivoting rear closure for a utility vehicle which is pivotable about first and second vertical axes.

BACKGROUND OF THE INVENTION

Rear closures for sport utility vehicles include a variety of different designs. Some rear closures are pivoted along an upper edge, such as in a minivan, so that the rear closure is pivotable upward. Other rear closures pivot down or sideways about a vertical axis. In some rear closures, the window and door pivot separately. The door may also be split into two pivoting doors which pivot about separate axes.

Rear closure doors which swing sideways about a single vertical pivot axis must be opened from one side of the vehicle. Accordingly, if the handle is on the right side of the door, then the driver must walk around the rear end of the vehicle to open the door, and if the handle is on the left side of the door, then the passenger would have to walk around the vehicle to open the rear door.

SUMMARY OF THE INVENTION

As a matter of convenience, it is desirable to enable a rear closure to be opened from either the left or right side of the vehicle. Accordingly, the invention provides a rear door which is pivotable about two different vertical axes by alternately disengaging latches along the axes.

More specifically, the invention provides a rear closure assembly for use with a utility vehicle. The rear closure assembly includes a door having first and second handles for pivoting the door about first and second pivot axes. Latches are positioned on the door and are engageable with strikers on the utility vehicle. The latches and strikers form the first and second pivot axes, and the latches are disengageable by the handles to selectively pivot the door about one of the pivot axes.

Preferably, the latches include left and right sets of latches at the first and second pivot axes, respectively. An interlock assembly is configured to prevent unwanted simultaneous disengagement of the left and right sets of latches. A left handle is operatively connected with a left set of latches to actuate pivotal movement about the second (right) axis, and a right handle is operatively connected to the right set of latches to actuate pivotal movement about the first (left) axis.

The interlock assembly includes the latches, which each have a moveable sensor plunger which senses engagement with the respective striker. Each sensor plunger is pivotally connected with a linkage to selectively permit actuation of one of the handles, depending upon the sensed condition of the respective latches.

Each linkage includes a curved rack connected to the respective handle for movement therewith, a plurality of blockers engageable with slots formed in the rack, and cables connecting the blockers to the sensor plungers to actuate movement of the blockers to selectively prevent handle actuation.

Each curved rack includes a lost motion slot with a follower in the lost motion slot, and each follower is operatively connected to the respective latch for disengaging the latch when the handle is actuated. The lost motion slot allows the blockers on the opposite curved rack to move into a blocking position before the latch is disengaged, thereby preventing simultaneous disengagement of all latches.

An electrical connector is positioned on the door and is operative to electrically connect the door with the vehicle. The rear window may optionally pivot with the rear closure.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
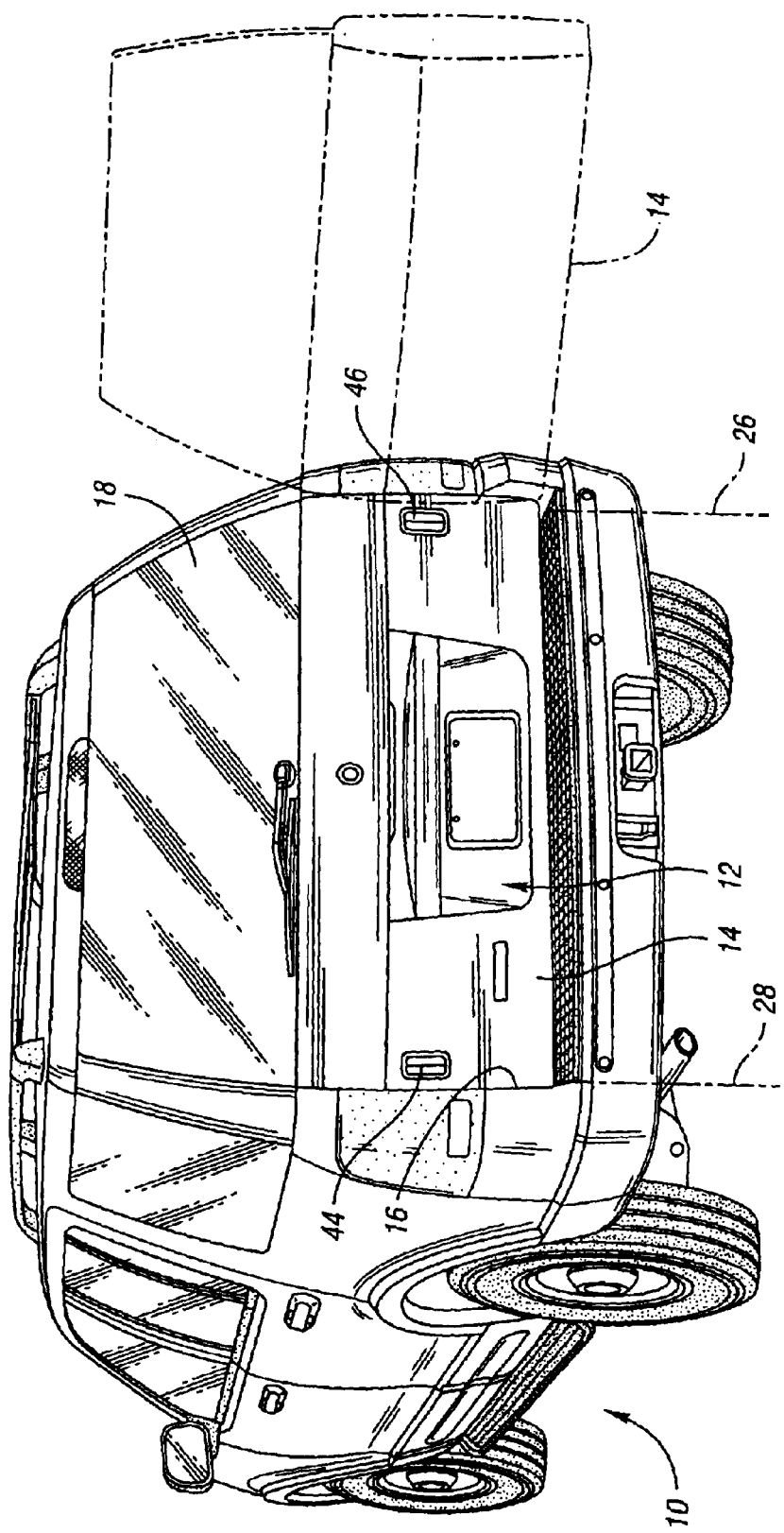
FIG. 1 shows schematic rear perspective view of a rear closure on a vehicle in accordance with the invention.

Referring to FIG. 1, a vehicle 10 is shown having a rear closure assembly 12 including a rear closure or rear door 14 which is positioned in a rear opening 16 of the vehicle 10. The door 14 is positioned below the rear window 18. The door 14 includes left and right handles 44, 46 to facilitate pivotal movement of the door 14 about the right and left axes 26, 28, respectively.

Figure 2:
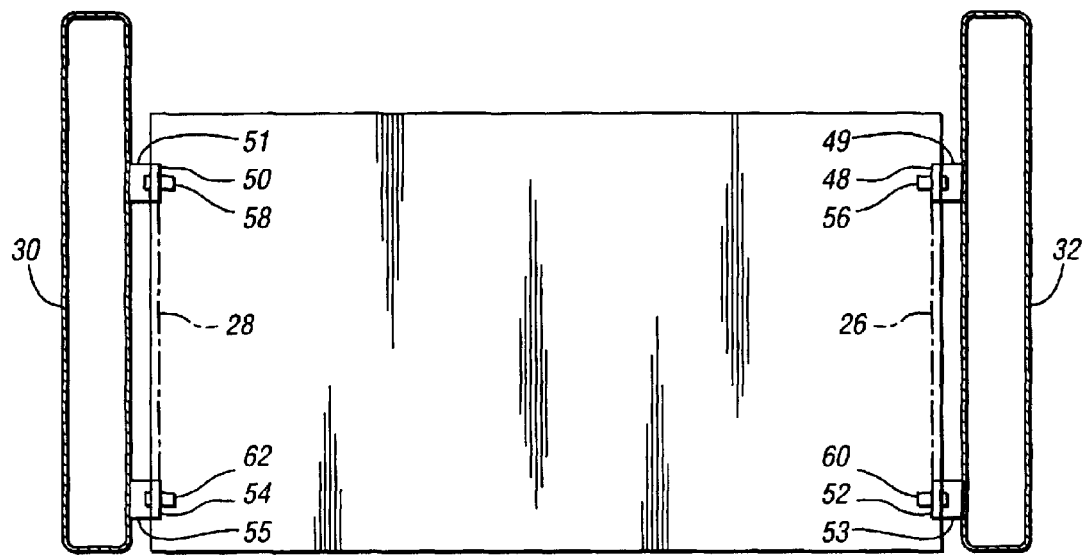
FIG. 2 shows a schematic rear perspective view of the rear closure on the vehicle of FIG. 1.

FIG. 2 shows a schematic rear view of the rear closure door 14 pivotally connected to the side walls 30, 32 of the vehicle. Strikers 48, 50, 52, 54 are supported on the side walls 30, 32 by support structure 49, 51, 53, 55, respectively to receive the latches 56, 58, 60, 62, respectively. As shown, the cooperation of the strikers 48, 50, 52, 54 and latches 56, 58, 60, 62 forms the right and left pivot axes 26, 28 about which the door 14 may pivot. The support structure 49, 51, 53, 55 need not be configured as shown. For example, they may be a T shaped or L shaped configuration.

Figure 3:
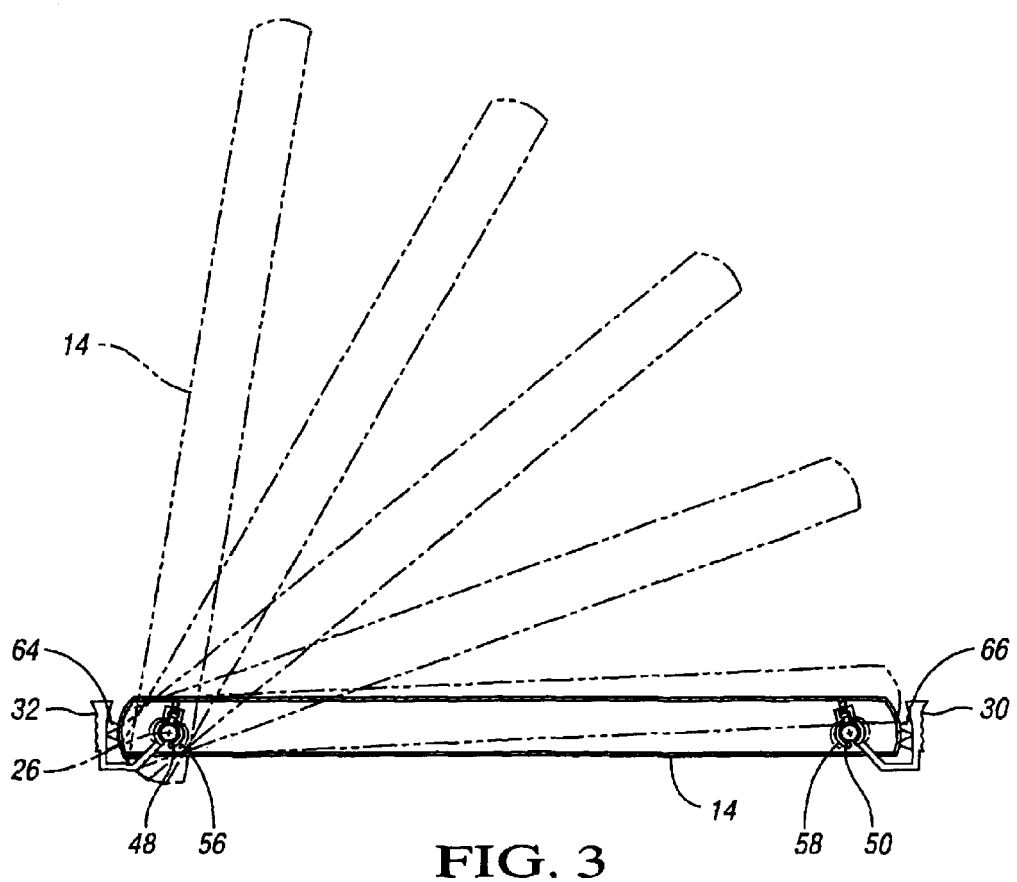
FIG. 3 shows a schematic top view of the rear closure on the vehicle of FIG. 1.

FIG. 3 shows a schematic top view of the door 14 pivoting to an open position about the pivot axis 26. Flexible seals 64, 66 are provided on the side walls 30, 32 for sealing the opening between the side walls 30, 32 and the opposing ends of the door 14.

Figure 4:
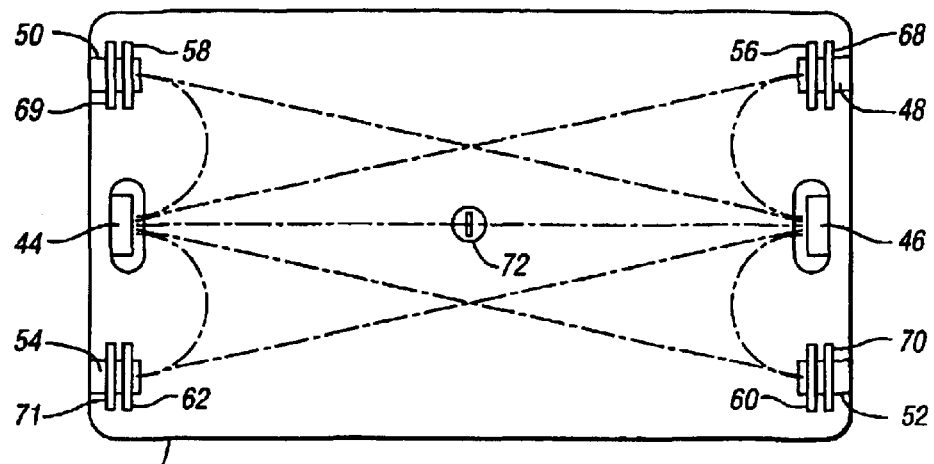
FIG. 4 shows a schematic rear view of the rear closure assembly.

FIG. 4 shows a schematic rear view of the door 14, and also illustrates the handles, latches, strikers and interlock assembly. The strikers 48, 50, 52, 54 and latches 56, 58, 60, 62 are shown in a different orientation than that of FIG. 2. However, the functionality is intended to be identical to that of FIG. 2 (i.e., the strikers form vertical axes about which the latches pivot). FIG. 4 is merely a schematic. The door 14 is connected to the strikers 48, 50, 52, 54 by the latches 56, 58, 60, 62.

As shown, sensors 68, 69, 70, 71 are provided to sense the engaged or disengaged condition of the latches 56, 58, 60, 62. The strikers 48, 50, 52, 54 are supported by the side walls of the vehicle. The sensed conditions of the latches 56, 58, 60, 62 are communicated with the opposite handles 44, 46 to prevent both handles 44, 46 from being actuated at the same time. An optional lock 72 may be provided to selectively lock the handles 44, 46, and to selectively unlock both handles to allow actuation of the handles 44, 46 simultaneously to remove the door 14 from the vehicle.

The sensors 68, 69, 70, 71 may be electrical sensors which send control signals to the solenoid associated with the handles 44, 46 which act to block movement of the handles 44, 46 when the solenoids are actuated. This electrical connection may be provided as indicated by the dashed lines in FIG. 4. Accordingly, by way of example, if the sensors 68, 70 sense that the latches 56, 60 are disengaged, a corresponding signal may be sent to the solenoid associated with the handle 46 to prevent actuation of the handle 46. Similarly, if the sensors 69, 71 sense that the latches 58, 62 are unlatched, then signals may be sent to the solenoid associated with the handle 44 to prevent actuation of the handle 44.

Alternatively, a mechanical interlock assembly 80 may be provided as shown schematically in FIGS. 4a–6b. The interlock assembly 80 is configured to prevent unwanted simultaneous actuation of the left and right handles 44, 46. As shown in FIG. 4, the left handle 44 is operatively connected to the latches 58, 62 to selectively disengage the latches 58, 62 for selective pivotal movement of the door 14 about the axis 26 (shown in FIG. 2), and the right handle 46 is operatively connected to the latches 56, 60 to selectively disengage the latches 56, 60 to allow pivotal movement about the axis 28 (shown in FIG. 2) by releasing the latches 56, 60 from the strikers 50, 54, respectively.

Figure 5A:
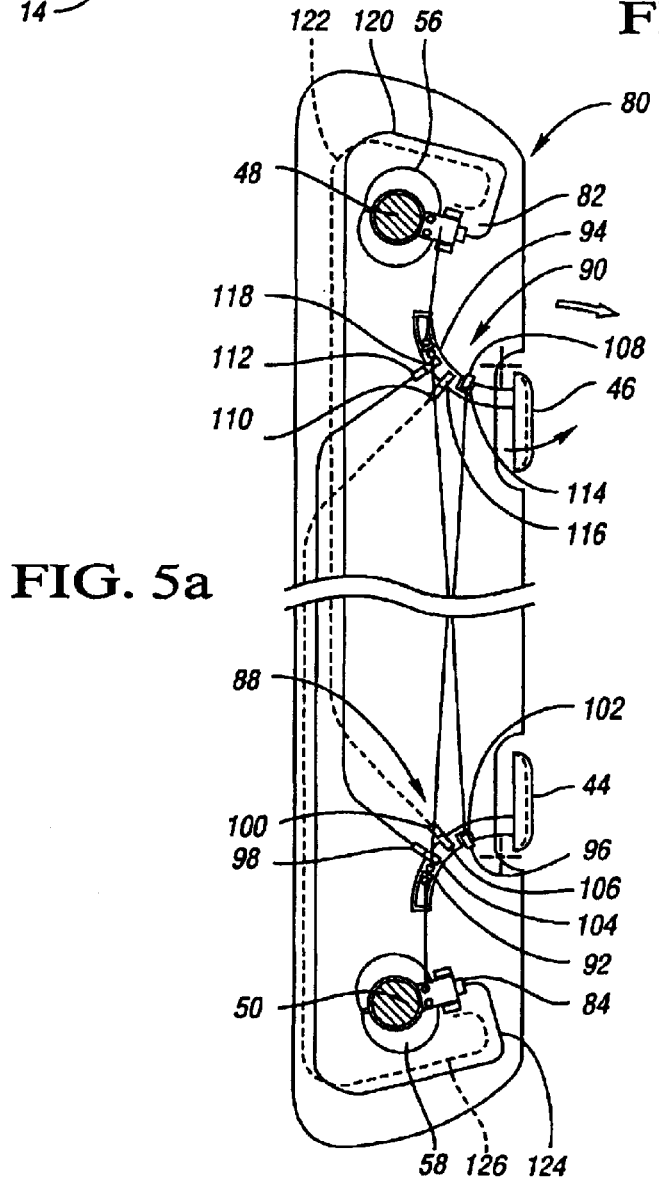
FIG. 5a shows a schematic cutaway top view of the rear closure in the closed position.

Referring to FIG. 5a, the interlock assembly 80 includes movable sensor plungers 82, 84 on each of the latches, 56, 58 which are engaged with linkages 88, 90. The sensor plungers 82, 84 sense engagement of the latches 56, 58 with the respective striker 48, 50. Each plunger 82, 84 is operatively connected with one of the linkages 88, 90 to selectively prevent actuation of one of the handles 44, 46, depending upon the sensed condition of the respective latches 56, 58.

Each linkage 88, 90 includes a curved rack 92, 94 connected to the respective handle 44, 46 for movement therewith. A plurality of blockers 96, 98, 100 are engageable with slots 102, 104, 106 formed in the curved rack 92. Similarly, blockers 108, 110, 112 are selectively engageable with the slots 114, 116, 118 in the curved rack 94. The cable 120 operatively connects the sensor 82 to the blocker 98, and the cable 122 operatively connects the corresponding sensor on the opposite latch 60 (shown in FIG. 4) to the blocker 100. Similarly, the cable 124 operatively connects the sensor plunger 84 with the blocker 112, and the cable 126 operatively connects the sensor plunger on the opposite latch 62 with the blocker 110. Preferably, the blockers 98, 100, 110, 112 are spring biased into locking engagement with the respective slots 104, 106, 116, 118, but tension in the cables 120, 122, 124, 126 prevents the blockers 98, 100, 110, 112 from entering the slots when the tailgate is closed. However, when the sensors 82, 84 sense that the latches 56, 58 are opening, the respective cable loosens as a result of movement of the plungers 82, 84, and the spring bias of the blockers moves the blockers 98, 100, 110, 112 into locking engagement with the respective slots 104, 106, 116, 118 to prevent actuation of the respective handle 44, 46. This operation will be described in greater detail with reference to FIGS. 5b–c.

Figure 5B:
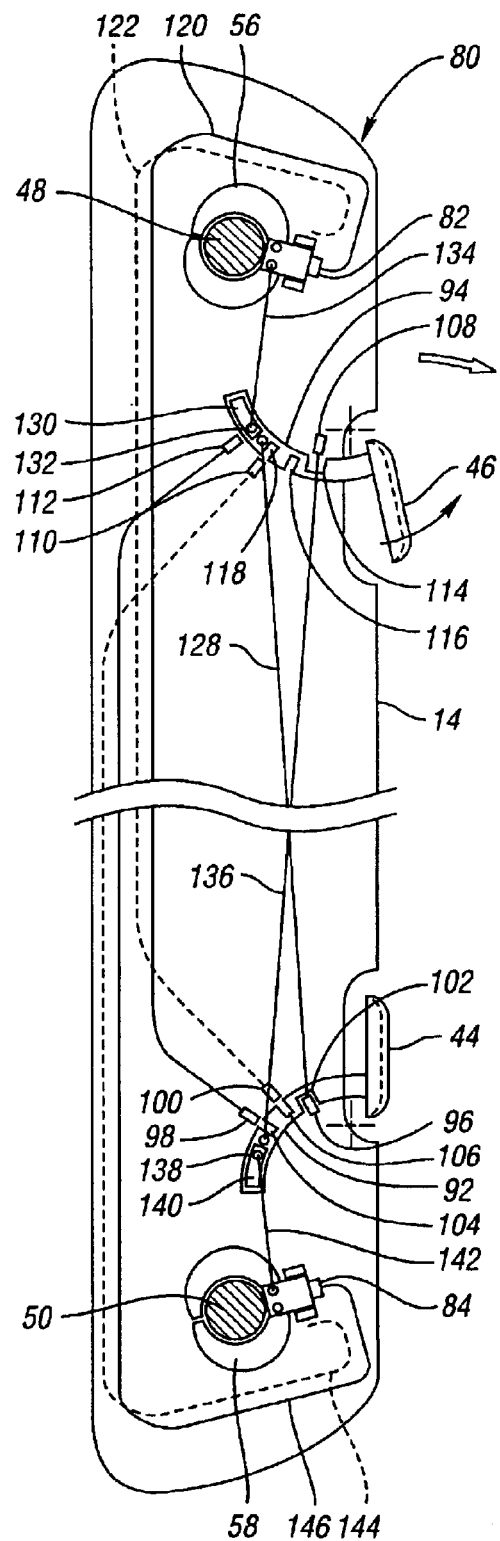
FIG. 5b shows a schematic cutaway top view of the rear closure with the handle pivoting towards an unlatched position.

Referring to FIG. 5b, initial actuation of the right handle 46 causes the curved rack 94 to start pivoting (to the right) with the handle 46. As a result of this initial pivoting movement, slack is created in the cable 128 which allows the spring biased blocker 96 to enter the slot 102, thereby preventing movement of the rack 92 and handle 44. As shown, the rack 94 includes a lost motion slot 130 and follower 132. The follower 132 is operatively connected with the latch 56 by the cable 134 to cause the latch 56 to open. After the initial pivotal movement or lost motion of the follower 132 within the slot 130, the follower 132 hits the top of the slot 130 and begins to pull the cable 134 to disengage the latch 56 to release the striker 48 to allow pivotal movement about the striker 50. Simultaneously, another cable is disengaging the latch 60 at the bottom of the door 14 while the left latches 58, 62 remain engaged.

Figure 5C:
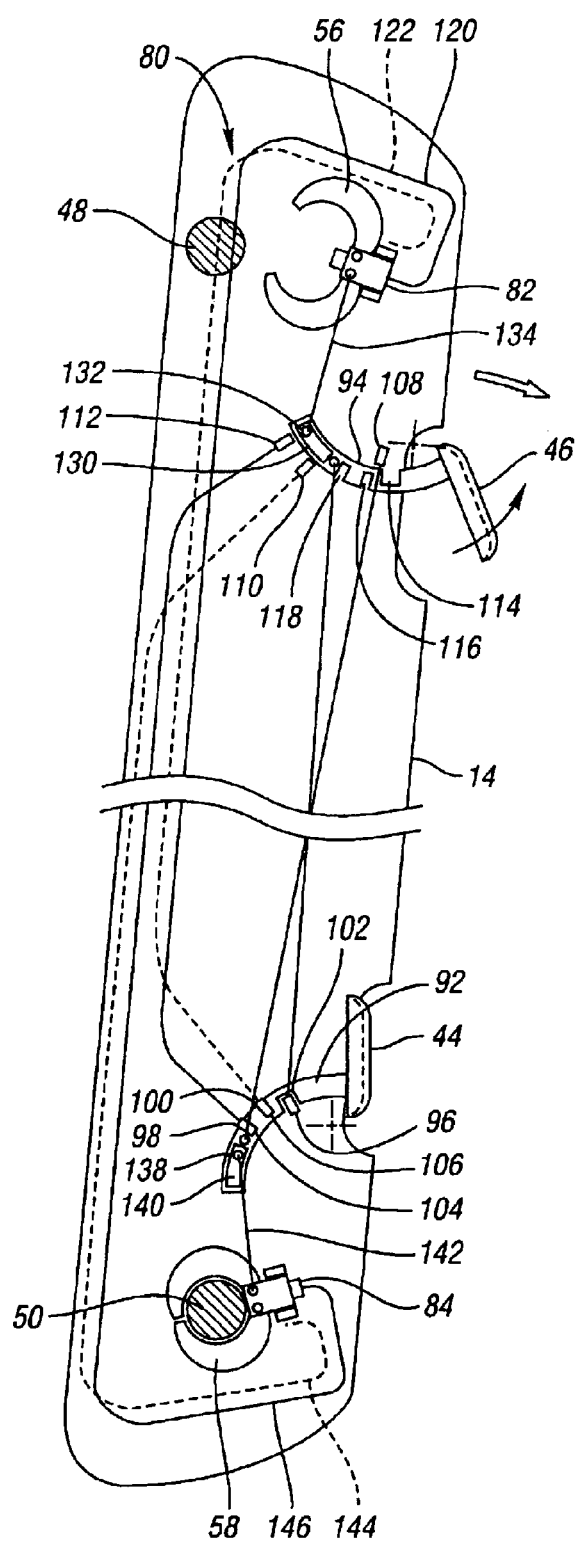
FIG. 5c shows a schematic cutaway top view of the rear closure pivoting toward an open position.

FIG. 5c illustrates that further pivotal movement of the handle 46 pivots the rack 94 sufficiently so that the cable 134 causes disengagement of the clamp 56 from the striker 48 to allow pivotal movement of the door 14 about the left strikers 50, 54 as shown. With the handle 46 pivoted fully out, sufficient slack exists in the cables 120, 122 to allow the blockers 98, 100 to enter the respective slots 104, 106 in the rack 92 to prevent actuation of the other handle 44.

Actuation of the handle 44 when the door 14 is in the closed position results in a mirror image of the linkage movements described above regarding movement of the handle 46. Initial pivotal movement of the handle 44 would cause the cable 136 to loosen, which would enable the blocker 108 to enter the slot 114 to prevent pivotal movement of the rack 94 and handle 46. Further pivotal movement of the handle 44 would cause the follower 138 to bottom out at the end of the lost motion slot 140, and the cable 142 would actuate disengagement of the latch 58 to allow pivotal movement of the door 14 with respect to the pivot axis 26 (shown in FIG. 2). As the clamp/latch 58 is opening, the cables 144, 146 sense the opening of the sensor plunger 84, which causes slack in the cables 144, 146 and allows the spring loaded blockers 110, 112 to enter the respective slots 116, 118 to lock the rack 94 and handle 46 in the closed position.

Figure 6A:
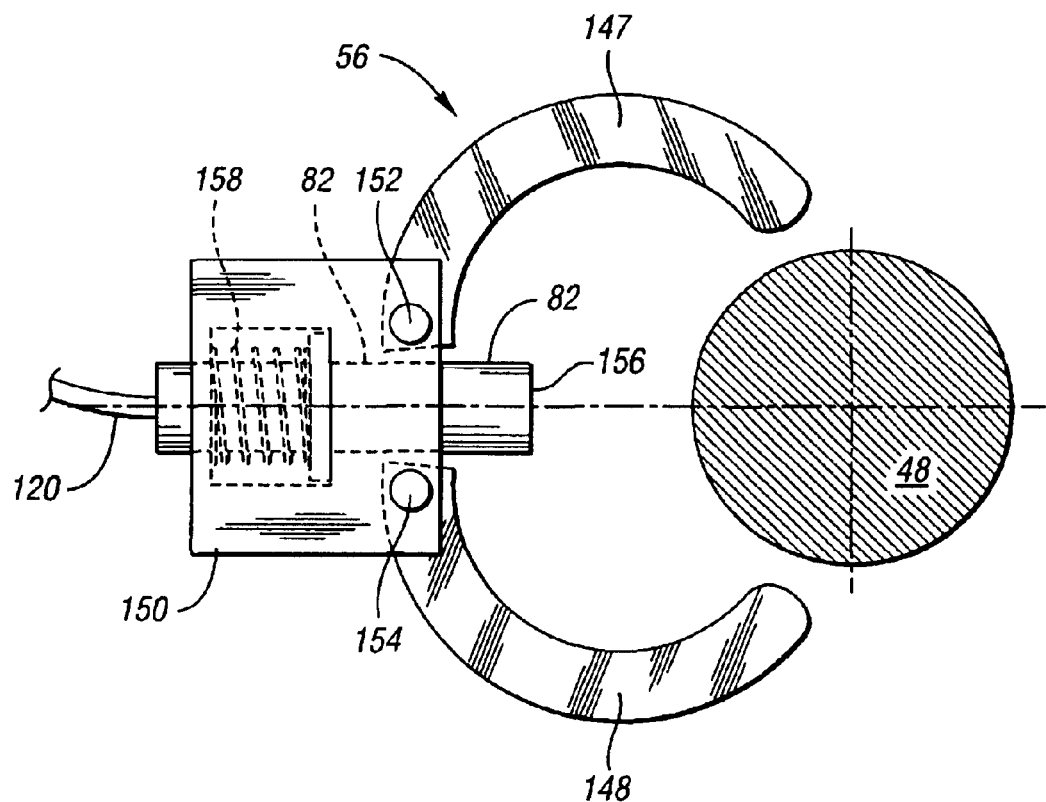
FIG. 6a shows a schematic sectional view of a latch prior to engagement with a striker in accordance with the invention.
Figure 6B:
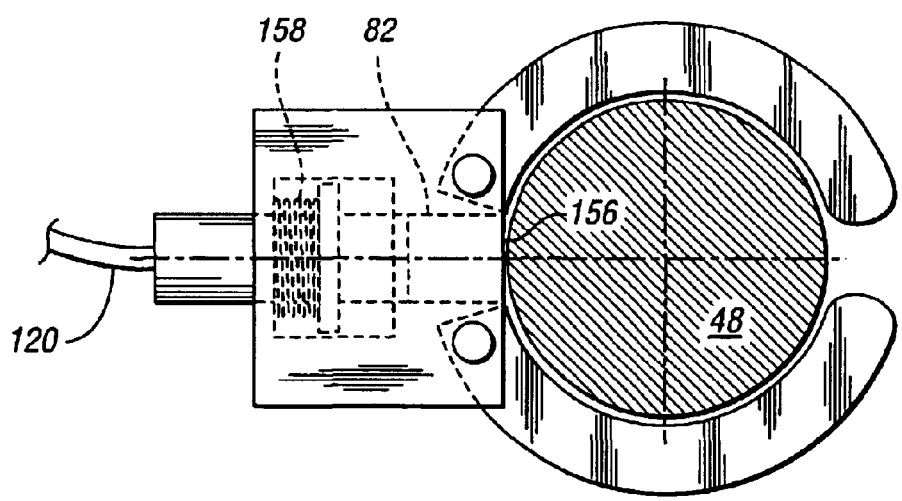
FIG. 6b shows a schematic section view of the latch of FIG. 6a engaged with the striker.

FIGS. 6a and 6b show enlarged schematic illustrations of a latch 56 including clamp arms 147, 148 which are pivotally connected to a base 150 on the door 14 at pivot joints 152, 154 for selectively engaging the striker 48. The sensor plunger 82 has a distal end 156 which contacts the striker 48 when the arms 147, 148 are closed around the striker 48, thereby moving the sensor plunger 82 axially against the bias of the spring 158. This movement of the sensor plunger 82 releases slack in the cable 120 to allow the blocker 98, shown in FIG. 5c, to enter the slot 104 as a result of its spring bias.

Accordingly, the above described interlock assembly 80 provides communication between the actuating handles 44, 46 for the two operating modes of the rear closure door 14 to ensure that all latches are engaged before one set of latches is released. The interlock assembly 80 assures that only one release handle is being operated at a time. The left and right release handles are therefore "aware" of the position of the opposing latches which will act as hinges for the actuated handle. This mechanical system is preferred over the electrical system since it will operate even if the vehicle electric power is interrupted and it offers the opportunity to completely remove the door while avoiding the need to reliably convey electric power to a removable door.

Returning to FIGS. 2–5c, the strikers are mounted as far rearward as possible on the vehicle so that the horizontal support which attaches it to the vehicle body is located behind the outer closure surface at full opening. This may result in a door rotation angle of approximately 80 degrees. The opening angle could be increased either by mounting the striker even deeper into the interior of the vehicle or by creating a feature, like a ridge, on the rear closure which would displace the outer closure surface outward. Alternative latching systems could also be used, such a ratchet and pawl latch.

Figure 7A:
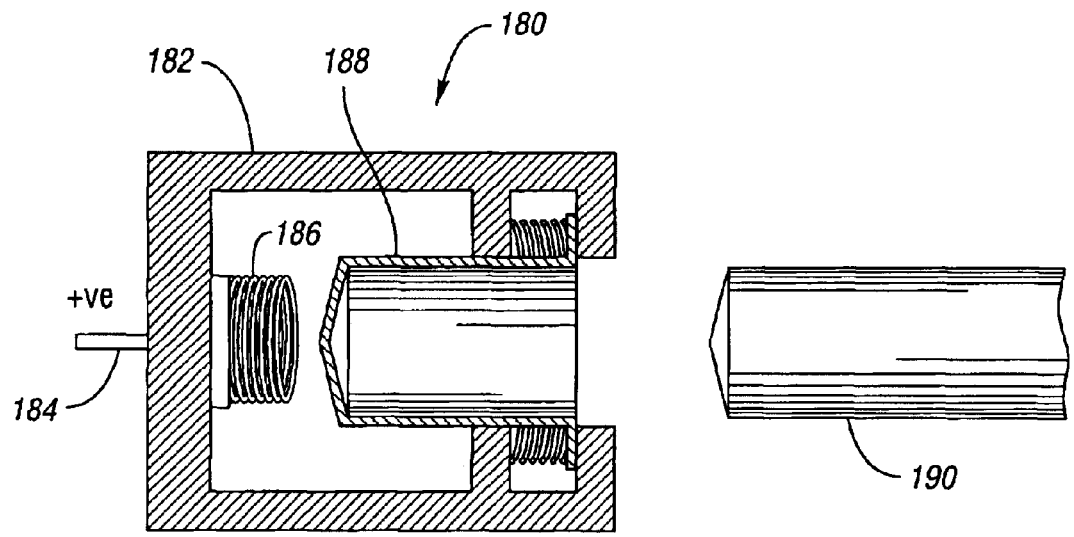
FIG. 7a shows a schematic cross-sectional view of an electrical connector in a disengaged position.
Figure 7B:
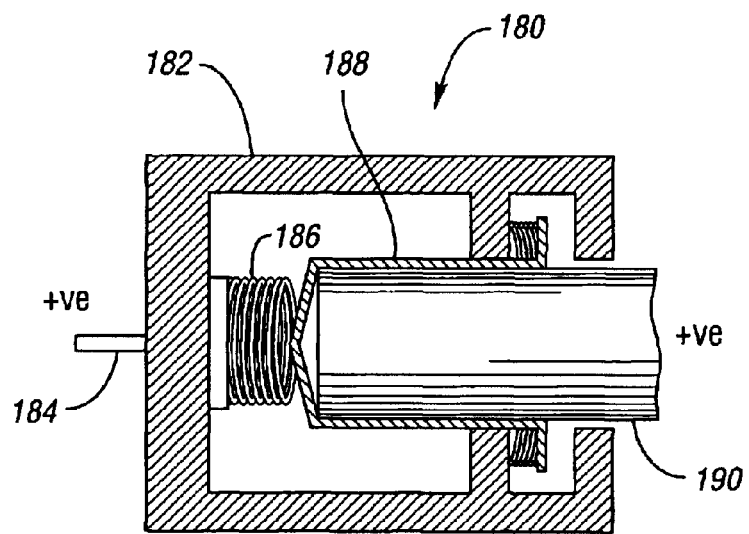
FIG. 7b shows a schematic sectional view of the electrical connector of FIG. 7a in the closed position.

By way of example, referring to FIGS. 7a and 7b, electric power may be delivered from the vehicle to the door via the connector assembly 180, which includes a non-conductive shell 182 with conductors 184, 186, 188 for communicating electric power with the conductive pin 190 when the pin 190 enters the conductor 188. The shell 182 is positioned in the vehicle, and the pin 190 extends from the rear closure door. In this manner, power may be provided to the rear closure door to operate a rear wiper or defroster without exposing live connections when the door is opened.

While the best modes for carrying out the invention have been described in detail, those familiar with the art to which this invention relates will recognize various alternative designs and embodiments for practicing the invention within the scope of the appended claims.

What is claimed is:

1. A rear closure assembly for use with a vehicle, the rear closure assembly comprising:
    a door having first and second handles for pivoting the door about first and second pivot axes; and
    latches on the door engageable with strikers on the vehicle, said latches and strikers forming said first and second pivot axes, and said latches being disengageable by said handles to selectively pivot the door about one of said pivot axes;
    wherein said latches comprises left and right sets of latches at said first and second pivot axes, respectively, and the rear closure assembly further comprises an interlock assembly configured to prevent unwanted simultaneous disengagement of said left and right set of latches.

2. The rear closure assembly of claim 1, wherein said first and second handles respectively comprise a left handle operatively connected with said left set of latches to actuate pivotal movement about the second axis, and right handle operatively connected to the right set of latches to actuate pivotal movement about the first axis.

3. The rear closure assembly of claim 2, wherein said interlock assembly includes:
    said latches each having a movable sensor plunger which senses engagement with the respective striker, each sensor plunger being operatively connected with a linkage to selectively permit actuation of one of the handles depending upon the sensed condition of the respective latches.

4. The rear closure assembly of claim 3, wherein each linkage includes:

a curved rack connected to the respective handle for movement therewith;
    a plurality of blockers engageable with slots formed in the rack; and
    cables connecting the blockers to said sensor plungers to actuate movement of the blockers to selectively prevent handle actuation.

5. The rear closure assembly of claim 4, wherein each curved rack includes a lost-motion slot with a follower in the lost-motion slot, each follower operatively connected to the respective latch for disengaging the latch when the handle is actuated, wherein said lost-motion slot allows said blockers on the opposite curved rack to move into a blocking position before the latch is disengaged, thereby preventing simultaneous disengagement of all latches.

6. A rear closure assembly for use with a vehicle, the rear closure assembly comprising:
    a door having first and second handles for pivoting the door about first and second pivot axes;
    latches on the door engageable with strikers on the vehicle, said latches and strikers forming said first and second pivot axes, and said latches being disengageable by said handles to selectively pivot the door about one of said pivot axes; and
    an electrical connector on the door operative to electrically connect the door with the vehicle.

7. The rear closure assembly of claim 3, wherein each said sensor plunger is tilted to provide improved packaging.

8. A rear closure assembly for use with a vehicle having a rear opening, the rear closure assembly comprising:
    a rear closure positioned in the rear opening, said rear closure being pivotally connected to the vehicle about first and second vertical axes to facilitate swinging pivotal movement about the first and second axes alternately to different opened positions;
    latches on the rear closure engageable with strikers on the vehicle, said latches and strikers forming said first and second axes, and said latches being disengageable by first and second handles to selectively pivot the rear closure about one of said vertical axes; and
    an electrical connector on the rear closure operative to electrically connect the rear closure with the vehicle.

9. The rear closure assembly of claim 8, wherein said latches comprise left and right sets of latches at said first and second pivot axes, respectively, and the rear closure assembly further comprises an interlock assembly configured to prevent unwanted simultaneous disengagement of said left and right sets of latches.

10. The rear closure assembly of claim 9, wherein said first and second handles respectively comprises a left handle operatively connected with said left set of latches to actuate pivotal movement about the second axis, and a right handle operatively connected to the right set of latches to actuate pivotal movement about the first axis.

11. The rear closure assembly of claim 10, wherein said interlock assembly includes:
    said latches each having a moveable sensor plunger which senses engagement with the respective striker, each sensor plunger being operatively connected with a linkage to selectively permit actuation of one of the handles depending upon the sensed condition of the respective latches.

12. The rear closure assembly of claim 11, wherein each linkage includes:
    a curved rack connected to the respective handle for movement therewith;

a plurality of blockers engageable with slots formed in the rack; and cables connecting the blockers to said sensor plungers to actuate movement of the blockers to selectively prevent handle actuation.

13. The rear closure assembly of claim 12, wherein each curved rack includes a lost-motion slot with a follower in the lost-motion slot, each follower operatively connected to the respective latch for disengaging the latch when the handle is actuated, wherein said lost-motion slot allows said blockers on the opposite curved rack to move into a blocking position before the latch is disengaged, thereby preventing simultaneous disengagement of all latches.

14. A rear closure assembly for use with a utility vehicle, the rear closure assembly comprising:

a door having first and second handles for pivoting the door about first and second vertical pivot axes;

latches on the door engageable with strikers on the vehicle, said latches and strikers forming said first and second pivot axes and said latches being disengageable by said handles to selectively pivot the door about one of said pivot axes;

wherein said latches comprise left and right sets of latches at said first and second pivot axes, respectively; and an interlock assembly configured to prevent unwanted simultaneous disengagement of said left and right sets of latches.

* * * * *